Dec. 4, 1951    R. W. MUELLER ET AL    2,577,144
APPARATUS FOR GAUGING THE LENGTHS OF ARTICLES
Filed Dec. 31, 1945    4 Sheets-Sheet 4

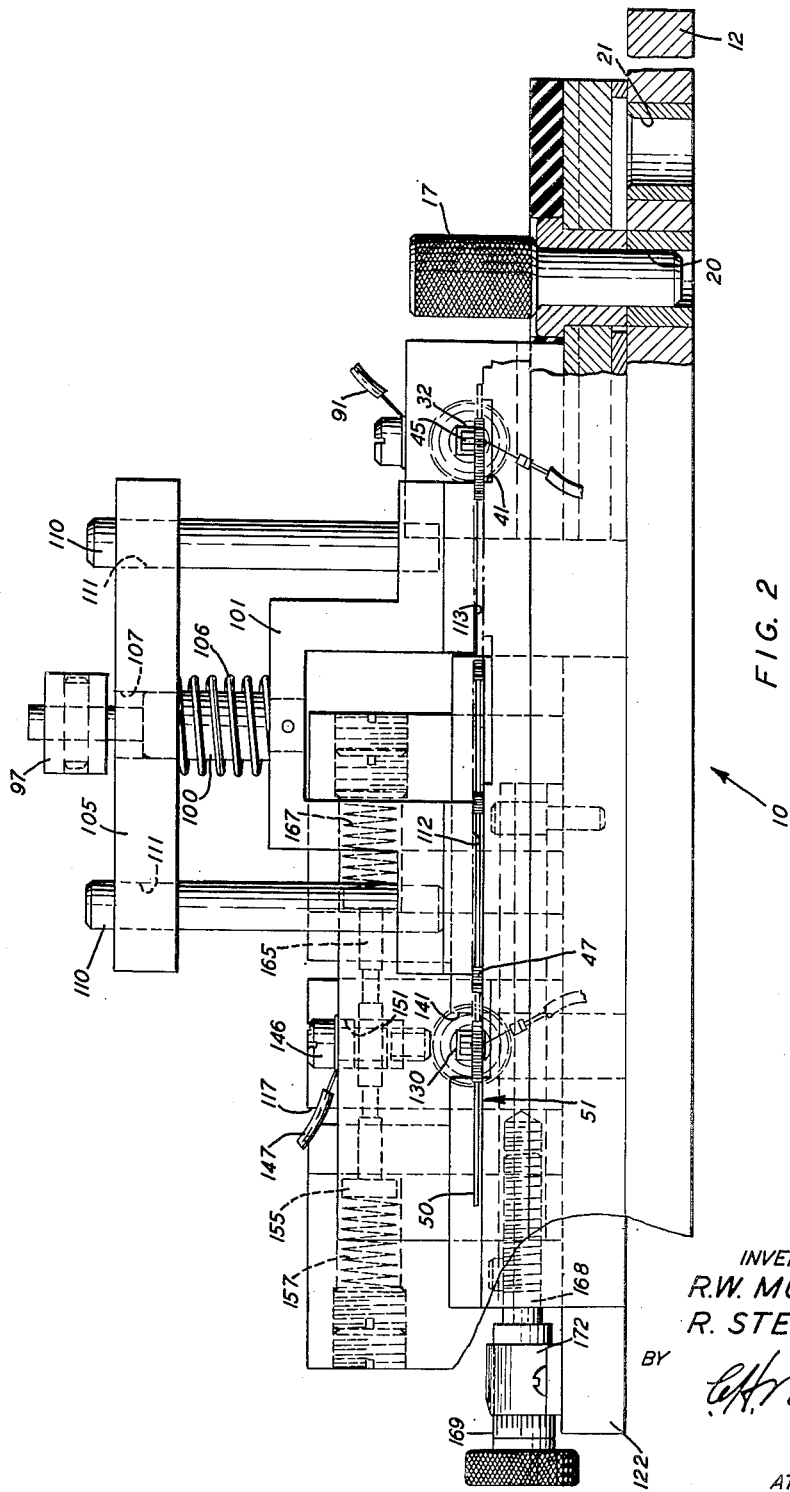

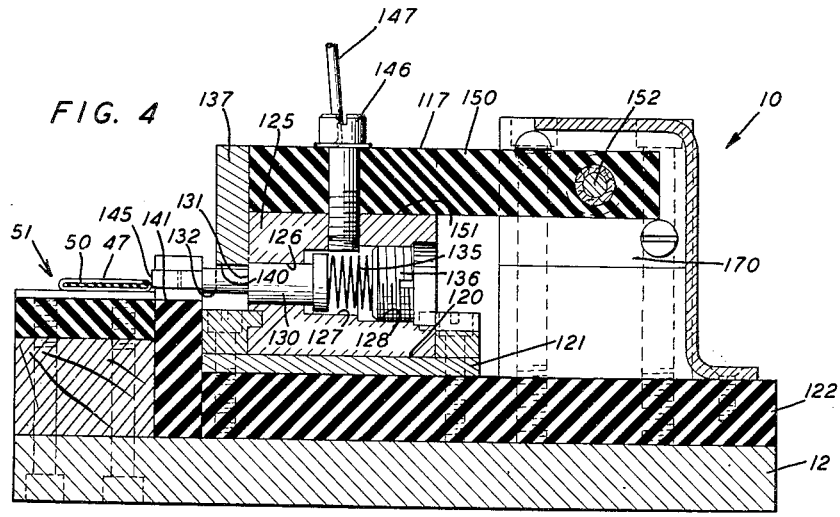
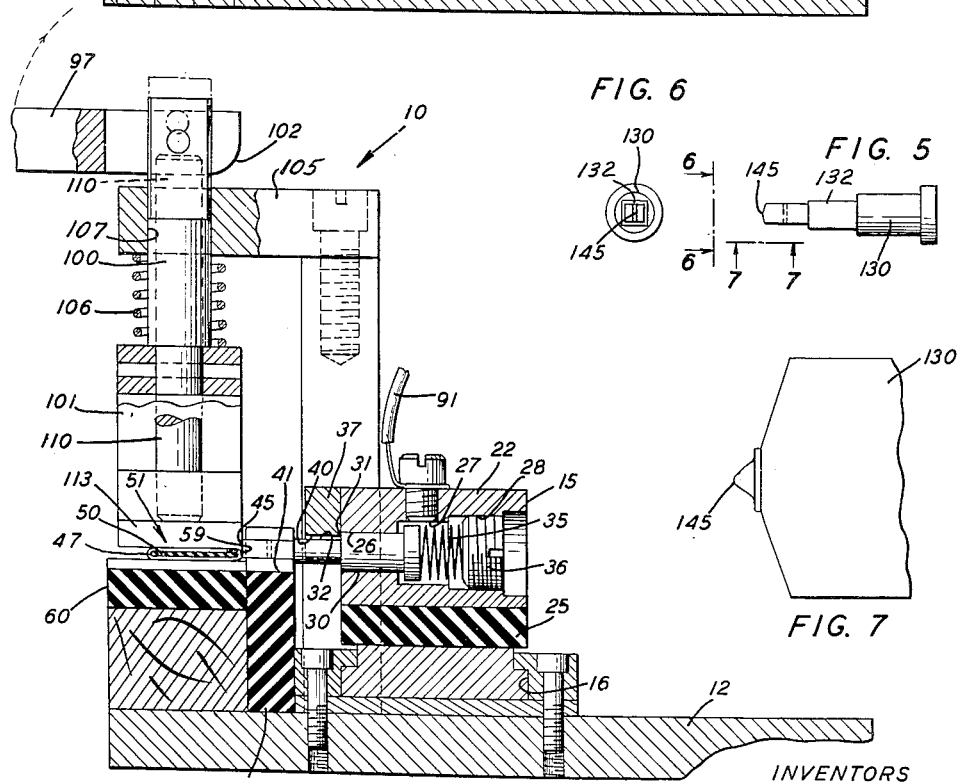
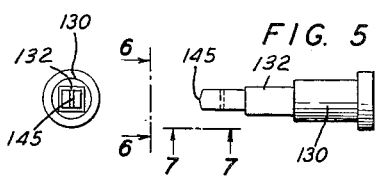
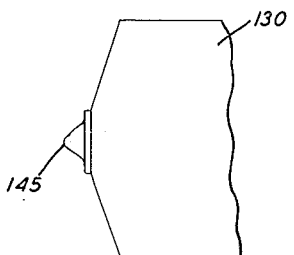

INVENTORS
R.W. MUELLER
R. STECH
BY
ATTORNEY

Patented Dec. 4, 1951

2,577,144

UNITED STATES PATENT OFFICE 2,577,144

APPARATUS FOR GAUGING THE LENGTHS OF ARTICLES

Raymond W. Mueller, Baltimore, and Richard Stech, Govans, Md., assignors to Western Electric Company, Incorporated, New York, N. Y., a corporation of New York Application December 31, 1945, Serial No. 638,566

6 Claims. (Cl. 175—183)

This invention relates to apparatus for gaging the lengths of articles, and more particularly apparatus for gaging the lengths of potentiometer cards.

In the manufacture of potentiometers of a type including potentiometer cards, the potentiometer cards are sometimes formed by winding small insulated resistance wires on body members and connecting leads to particular intermediate turns of the resistance wires having a predetermined resistance therebetween. In some potentiometers it is required that there be a predetermined linear distance between the turns of the resistance wires to which the leads are attached. It is desirable to check the distances between the turns of the resistance wires prior to the assembly of the potentiometers so that the potentiometers need not be disassembled if the distances between such turns are outside allowable limits. In order to measure the distance between the turns of small wire, it is necessary to locate the particular intermediate turns to which the leads are connected, which has been difficult to do by visual inspection even with the aid of strong magnifying devices.

An object of the invention is to provide new and improved apparatus for gaging the lengths of articles.

Further objects of the invention are to provide new and improved apparatus for measuring the linear distance between turns of a potentiometer card to determine whether such distances lie within allowable limits.

An apparatus constituting a specific embodiment of the invention includes a gaging fixture in which a potentiometer card having a resistance wire wound around a body member thereof may be placed. A lead secured to the zero turn, which has other turns on both sides thereof, of the resistance wire is connected to a galvanometer and the card is slid along a stationary contactor, which also is connected to the galvanometer. When the zero turn of the resistance wire contacts the contactor the galvanometer will indicate a larger current than when any of the turns adjacent to the zero turn are in engagement with the contactor so that it will be known that the contactor is in engagement with the zero turn of the resistance wire. The potentiometer card then is clamped in this position in the gaging fixture. A lead connected electrically to the unity turn, which also has other turns positioned on both sides thereof, of the resistance wire is connected to the galvanometer, and a movable contactor connected to the galvanometer may be moved along the potentiometer card until it engages the unity turn of the resistance wire, which position of the contactor is located by the reading of the galvanometer in the manner the zero turn is located. A contactor carried with the movable contactor breaks a circuit to an electric lamp if the contactor engaging the unity turn of the resistance wire is moved out of a predetermined range with respect to the contactor engaging the zero turn of the resistance wire. Hence, if the linear length between the zero turn and the unity turn of the resistance wire is not within predetermined limits, the lamp will be darkened to indicate that fact.

A complete understanding of the invention may be obtained from the following detailed description of an apparatus forming specific embodiments thereof, when read in conjunction with the appended drawings, in which Fig. 1 is a top plan view of a portion of an apparatus embodying the invention with portions thereof shown in section;

Fig. 2 is a fragmentary, front elevation of the apparatus;

Fig. 3 is a vertical section taken along line 3—3 of Fig. 1;

Fig. 4 is a vertical section taken along line 4—4 of Fig. 1;

Fig. 5 is a side elevation of a portion of the apparatus;

Fig. 6 is a vertical section taken along line 6—6 of Fig. 5;

Fig. 7 is an enlarged, vertical section taken along line 7—7 of Fig. 5, and

Figure 8:
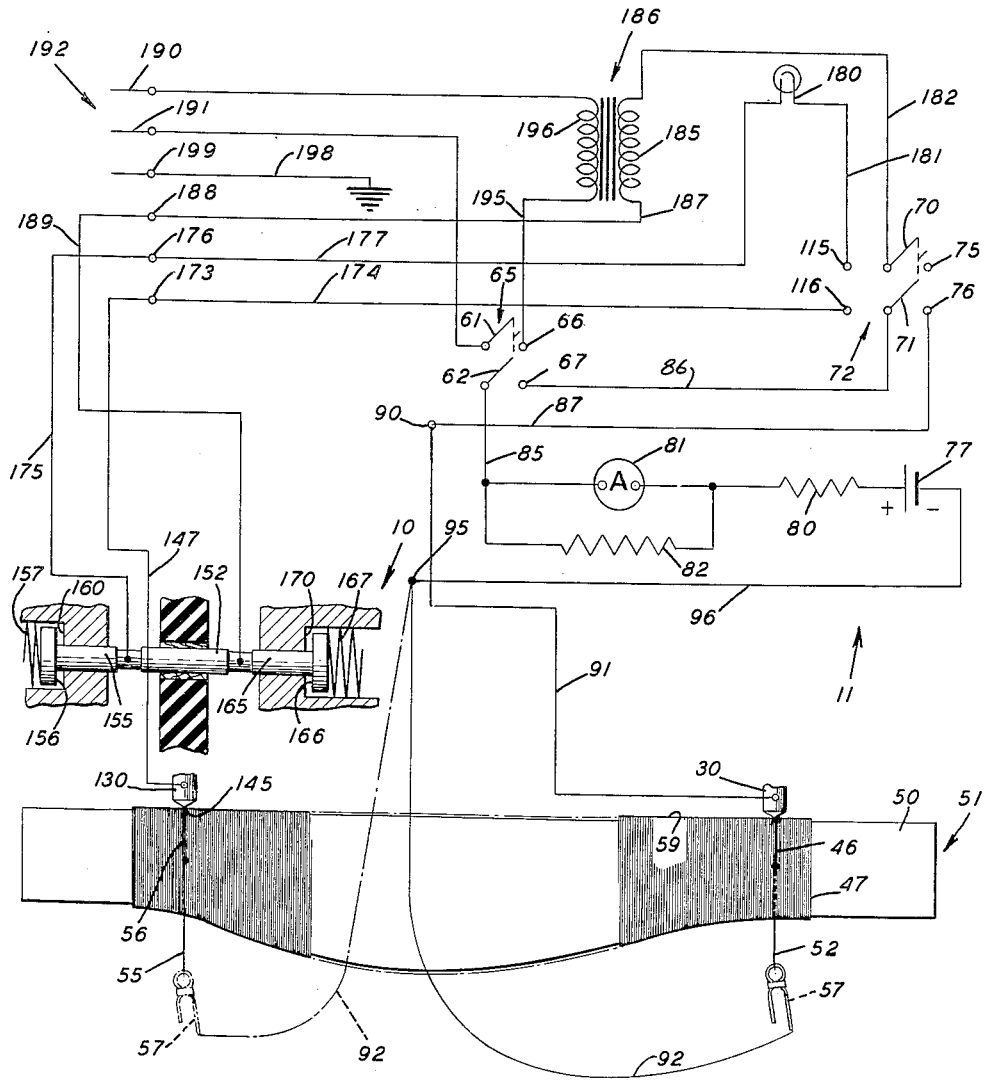
Fig. 8 is an enlarged diagrammatic view of the apparatus.

Referring now in detail to the drawings, there is shown therein a gaging fixture 10 (Fig. 1) and a test set 11 (Fig. 8). The gaging fixture includes a base plate 12 (Fig. 1) and a contactor unit 15, which is slidably mounted on a guideway 16. A locking pin 17 normally is positioned either in a bushing 20 (Fig. 2) or in a bushing 21 to secure the contactor unit 15 against movement relative to the base plate 12.

The contactor unit 15 includes a steel block 22 (Fig. 3) and an insulating block 25, which insulates the block 22 from the ground. The block 22 is provided with a bore 26, a counterbore 27 and a tapped bore 28. A contactor 30 is mounted slidably in the bore 26 and is provided with a shoulder 31 and a square shank 32. A compression spring 35, which abuts the contactor 30 and a threaded plug 36, presses the contactor 30 toward the left, as viewed in Fig. 3, and normally holds the contactor 30 in a position in which the shoulder 31 of the contactor abuts a stop 37. The stop 37 is provided with a square hole 40, which receives the square shank 32 of the contactor 30 in a close-fitting but slidable engagement therewith. The end of the contactor 30 projects through an opening 41 formed in an edge abutment 42 composed of electrical insulation, and is provided with a narrow line-like tip 45.

A zero turn 46 of an insulated resistance wire 47, which has a very small diameter (of the order of three and one half thousandths of an inch), and is wound closely on a body member 50 to form a potentiometer card 51, is connected electrically to a lead 52, and a lead 55 is connected electrically to a unity turn 56 of the resistance wire 47. To test the linear distance between the zero turn 46 and the unity turn 56 of the resistance wire 47, the zero turn and the unity turn, each of which is positioned intermediate of other turns of the resistance wire, must be located.

A clip 57 (Fig. 8) is clamped to the lead 52, and the potentiometer card 51 is placed on support 60 (Fig. 3) composed of electrical insulation in a position in which the zero turn 46 is near the contactor 30. In this position, an edge 59 of the potentiometer card 51 engages the edge abutment 42 and is engaged by the narrow, line-like tip 45 of the contactor 30. The edge 59 of the card is formed by the closely wound resistance wire 47, and the insulation of the resistance wire is absent along this edge, so that each turn may be contacted electrically. However, the sides of the turns of the resistance wire are completely insulated from one another.

Contactors 61 and 62 (Fig. 8) of a master switch 65 are moved into engagement with contacts 66 and 67, respectively, thereof. Contactors 70 and 71 of a double-pole double-throw switch 72 are moved into engagement with a dummy contact 75 and a contact 76, respectively, thereof. This closes a circuit to a battery 77 and current from the battery flows through a protective resistance 80, a galvanometer 81 and a shunt resistance 82 connected in parallel with the galvanometer 81, a conductor 85, the contactor 62, a conductor 86, the contactor 71, the contact 76, a conductor 87, a terminal post 90 of the test set 11, a conductor 91, the contactor 30, the portion of the resistance wire 47 between the contactor 30 and the zero turn 46 thereof, the lead 52, the clip 57, a conductor 92, a terminal post 95 and a conductor 96. The potentiometer card is slid along the edge abutment 42 until the galvanometer 81 has the highest possible reading for any of the positions of the card. When this reading is the highest, the contactor 30 will be in engagement with the zero turn 46 of the resistance wire 47 so that there will be the least resistance between the contactor 30 and the lead 52 possible for any positions of the card, which causes the high reading of the galvanometer.

After the potentiometer card 51 has been located in a position in which the zero turn 46 of the insulated resistance wire 47 is contacted by the contactor 30, a lever 97 (Fig. 3) is moved in a counterclockwise direction, as viewed in Fig. 3, to the position in which it is shown in Fig. 3. The lever is pivotally mounted on a post 100 of a clamp 101 and is provided with cam portions 102—102. This moves the cam portions 102—102 out of engagement with a bracket 105 to permit a compression spring 106 to urge the clamp downwardly to clamp the potentiometer card 51 between the clamp and the support 60 in its position in which the zero turn 46 of the resistance wire 47 is engaged by the line-like tip 45 of the contactor 30. The post 100 is slidably mounted in a bore 107 in the bracket 105, and liner pins 110—110 (Fig. 2) secured to the clamp 101 are slidably mounted in bores 111—111 formed in the bracket. The clamp 101 has a pair of jaws 112 and 113 for holding the potentiometer card 51 against the support 60.

The contactors 70 and 71 (Fig. 8) then are moved out of engagement with the contacts 75 and 76, respectively, and the clip 57 is disconnected from the lead 52 and is connected to the lead 55. The contactors 70 and 71 of the switch 72 are moved into engagement with contacts 115 and 116, respectively.

A contactor unit 117 (Figs. 1 and 4) is slidable along a guideway 120, which includes a base plate 121 supported by a plate 122 composed of electrical insulation, which plate 122 insulates the guideway 120 and hence the contactor unit 117 from the ground. A block 125 of the contactor unit 117 is provided with a bore 126, a counterbore 127 and a tapped bore 128. A contactor 130 having a shoulder 131 and a square shank 132 is slidably mounted in the bore 126. A compression spring 135 secured in the counterbore 127 by a threaded plug 136 urges the contactor 130 against a stop 137. The square shank 132 of the contactor 130 fits closely within a square hole 140 formed in the stop 137, and the end of the contactor 130 extends through an opening 141 formed in the edge abutment 42. A line-like tip 145 of the contactor 130 engages the edge 59 of the potentiometer card 51 at a point thereon at or near the unity turn 56 of the resistance wire 47. A bolt 146 connects a conductor 147 electrically to the contactor 130 and secures an arm 150 made of electrical insulaion in a groove 151 in the block 125.

Figure 1:
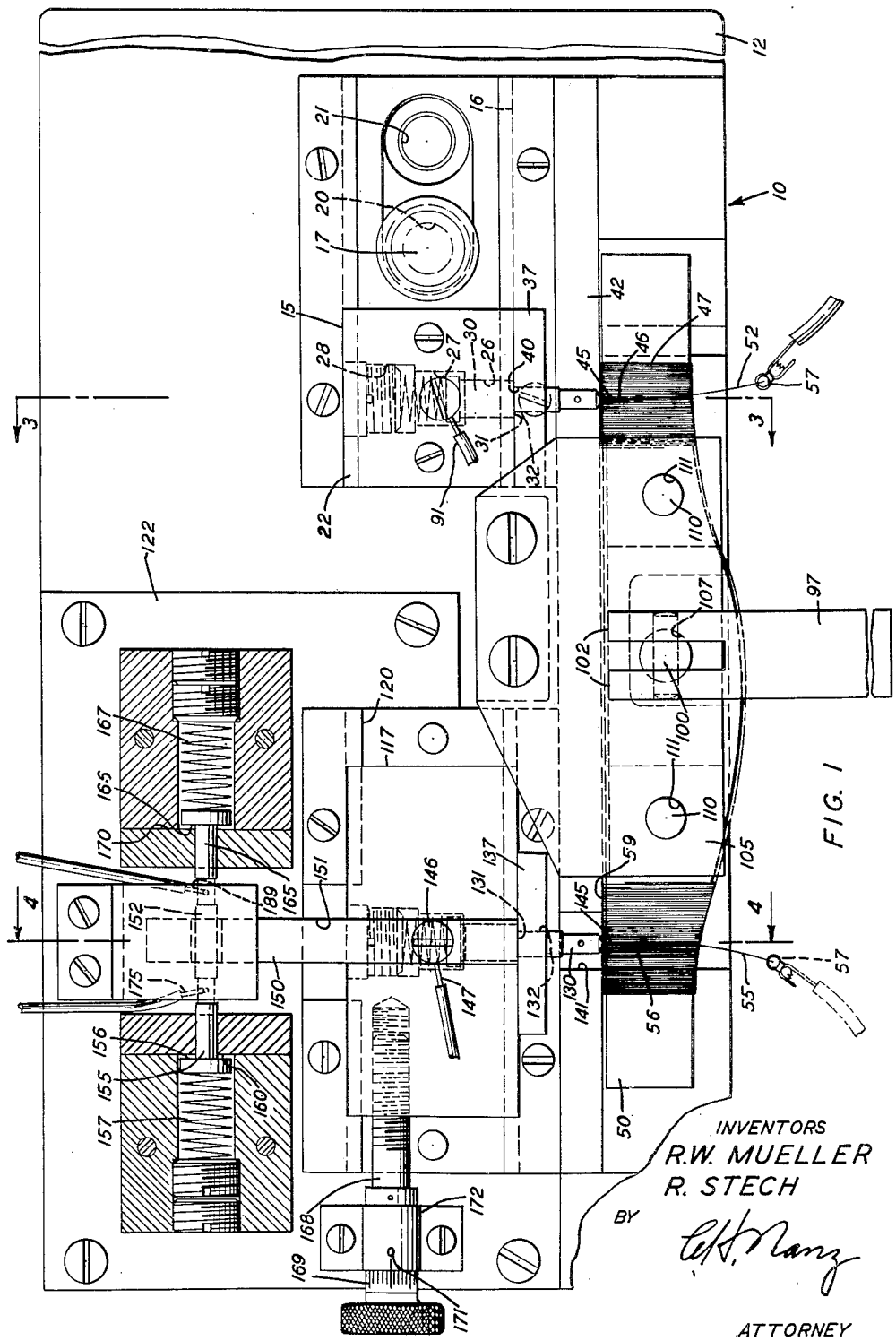

The arm 150 carries a conductive rod 152, which is positioned in alignment with a contactor 155 having a shoulder 156 formed thereon, which contactor 155 is urged by a compression spring 157 to the right, as viewed in Fig. 1. A fixed abutment 160 serves as a stop to limit movement of the contactor 155 toward the right. A contactor 165 identical with the contactor 155 is provided with a shoulder 166 and is urged toward the left by a compression spring 167. A fixed abutment 170 serves to limit movement of the contactor 165 toward the left. The distance between the shoulder 156 on the contactor 155 and the shoulder 166 on the contactor 165, when the contactors 155 and 165 both are in engagement with the conductive rod 152, is greater by a predetermined amount than the distance between the fixed abutment 160 and the fixed abutment 170.

A micrometer adjustment screw 168 having a scale 169 formed thereon may be turned to move the contactor unit 117 along the guideway 120, and a pointer 171 formed on a bearing 172 mounting the micrometer screw 168 indicates on the scale 169 the distance the contactor unit 117 is moved along the guideway 120. The micrometer screw 168 is preset at zero with the tip 145 of the adjustable contactor 130 at a known distance from the tip 45 of the fixed contactor 30, and the reading of the pointer 171 on the scale 169 is the distance the contactor 130 is moved from its zero or standard point. The contactor unit 117 and the arm 150 may be moved either toward the right or toward the left from a central position a predetermined distance from the contactor unit 15, a distance sufficient that the conductive rod 152 is moved out of engagement with either the contactor 155 or the contactor 165, depending on which direction the contactor unit 117 and the conductive rod 152 are moved.

The conductor 147 electrically connects the contactor 130 to a terminal post 173, which is connected by a conductor 174 to the contact 116. When the contactors 70 and 71 are moved into engagement with the contacts 115 and 116, as described hereinabove, current flows through the following circuit: the battery 77, the resistance 80, the shunt resistance 82 and the galvanometer 81, the conductor 85, the contactor 62, the contact 67, the conductor 86, the contactor 71, the contact 116, the conductor 174, the terminal post 173, the conductor 147, the contactor 130, the portion of the resistance wire 47 including the unity turn 56 of the resistance wire between the contactor 130 and the lead 55, the lead 55, the clamp 57, the conductor 92, the terminal post 95 and the conductor 96. The contactor unit 117 then is moved along the guideway 120 until the galvanometer 81 indicates the largest passage of current for any position of the contactor 130 relative to the potentiometer card 51, in which position the narrow line-like tip 145 of the contactor 130 engages the unity turn 56 of the resistance wire 47.

If the engagement between the conductive rod 152 and both of the contactors 155 and 165 has not been broken by the movement of the contactor 117 and the conductive rod 152 in moving the contactor 130 to its position in engagement with the unity turn 56 of the resistance wire 47, the following circuit is unbroken: a conductor 175 connected to the contactor 155, a terminal post 176, a conductor 177, an electric lamp 180, a conductor 181, the contact 115, the contactor 70, a conductor 182, a secondary winding 185 of a transformer 186, a conductor 187, a terminal post 188, a conductor 189, the contactor 165 and the conductive rod 152. Conductors 190 and 191 of a power-line 192 supply power to the transformer 186 through the following circuit: the conductor 191, the contactor 61, the contact 66, a conductor 195, a primary winding 196 of the transformer 186 and the conductor 190. This energizes the secondary winding 185 of the transformer 186 so that the lamp 180 is lighted, which fact indicates that the engagement between the conductive rod 152 and both of the contactors 155 and 165 has not been broken, which is true only when the distance between the zero turn 46 of the resistance wire 47 and the unity turn 56 of the resistance wire 47 is within allowable limits.

If the distance between the zero turn 46 of the resistance wire 47 and the unity turn 56 of the resistance wire 47 is too long, in moving the contactor 130 into engagement with the unity turn 56, the conductive rod 152 is moved to the left, as viewed in Fig. 8, a distance sufficient to cause the shoulder 166 of the contactor 165 to strike the abutment 170 and the conductive rod 152 moves out of engagement with the contactor 165. This breaks the circuit to the lamp 180, which darkens and indicates that the length between the zero turn 46 and the unity turn 56 is not within the allowable limits and that the potentiometer card 51 is not satisfactory. Conversely, if the distance between the zero turn 46 and the unity turn 56 is too short, the conductive rod 152 is moved out of engagement with the contactor 155 in moving the contactor 130 into engagement with the unity turn 56 so that the lamp 180 is darkened in this instance, thereby indicating that the potentiometer card 51 is not satisfactory.

A conductor 198 connected to a terminal post 199 connected to the housing (not shown) of the test set 11 grounds the housing of the test set for purposes of safety. Thus, even in case of a short to the housing the housing may be touched without danger.

In practicing the invention in accordance with the apparatus described hereinabove, the potentiometer card 51 (Fig. 3) is placed upon the support 60 in a position in which the edge 59 thereof rests against the edge abutment 42 in contact with the contactors 30 and 130. The clip 57 is connected to the lead 52 and the master switch 65 (Fig. 8) is closed. The contactors 70 and 71 are moved into engagement with the contactors 75 and 76, respectively, of the switch 72 and the potentiometer card 51 is moved relative to the contactor 30 to a position in which the galvanometer 81 has its highest reading for any position of the card relative to the contactor 30, in which position the card is properly positioned in the gaging fixture 10 and the unity turn 46 of the resistance wire 47 is engaged by the contactor 30.

The lever 97 (Fig. 3) then is moved to the position shown in Fig. 3 and the clamp 101 clamps the potentiometer card 51 firmly against the support 60 in the position in which it has been located, that is, in a position in which the contactor 30 engages the zero turn 46 (Fig. 8) of the resistance wire 47. The clip 57 is disconnected from the lead 52 and is connected to the lead 55. The contactors 70 and 71 are moved out of engagement with the contacts 75 and 76 and into engagement with the contactors 115 and 116, respectively, and the lamp 180 is lighted.

The micrometer screw 168 (Fig. 1) then is turned, if necessary, until the narrow line-like tip 145 of the contactor 130 engages the unity turn 56 of the resistance wire 47, which position of the contactor 130 may be determined by the relative readings of the galvanometer 81 (Fig. 8). If the conductive rod 152 is in engagement with both the contactor 155 and the contactor 165, the lamp 180 remains lighted, which fact will indicate that the distance between the zero turn 46 of the resistance wire 47 and the unity turn 56 thereof is within allowable limits. If the engagement between the conductive rod 152 and either the contactor 155 or the contactor 165 is broken, the lamp 180 is darkened, which fact indicates that the distance from the zero turn 46 of the resistance wire 47 to the unity turn 56 thereof is not within allowable limits. The actual distance between the turns 46 and 56 may be obtained from adding or subtracting, depending on which direction the contactor 130 is moved relative to the contactor 30, the reading of the pointer 171 (Fig. 1) on the scale 169 formed on the micrometer screw 168 to or from the distance between the tip 145 of the contactor 130 and the tip 45 of the contactor 30 when the micrometer reads zero. The card then may be taken out of the gage and the operation described hereinabove may be repeated to gage the length of another similar card (not shown).

The locking pin 17 (Fig. 2) may be moved from the bushing 20, and the contactor unit 15 may be slid to the right, as viewed in Fig. 2, to a position in which the locking pin 17 is aligned with the bushing 21. The locking pin 17 may be then inserted into the bushing 21 and the gage may be used to measure the distance between zero turns and unity turns of potentiometer cards, which have longer effective lengths than that of the potentiometer card 51.

The above-described apparatus serves to accurately determine the actual effective lengths of potentiometer cards and also determine whether the effective lengths of the potentiometer cards are within allowable physical limits. The apparatus is very accurate, while it is simple in construction and is easy to operate. The apparatus quickly and accurately locates turns of every small resistance wires having leads connected thereto and eliminates the inherent disadvantages of locating them by unreliable, difficult and time-consuming visual inspection methods.

What is claimed is:

1. A gage for determining the distance between two tapped turns of a resistance wire of a potentiometer card, which comprises a stationary contactor for engaging a single turn of a resistance wire of a potentiometer card at a time, a support upon which a potentiometer card may be placed in a position in which one turn of a resistance wire thereof is engaged by the stationary contact and along which the potentiometer card may be slid for movement relative to the contactor, means for electrically determining when the potentiometer card is in a position in which the contactor engages a tapped turn of the resistance wire, means for clamping the potentiometer card in the last-mentioned position, a movable contactor for engaging a single turn of the resistance wire at a time, means for sliding the movable contactor along the potentiometer card, means for electrically determining when the movable contactor contacts another tapped turn of the resistance wire, and means for gaging the distance between the stationary contactor and the movable contactor.

2. A gage for determining the distance between two tapped turns of a resistance wire of a potentiometer card, which comprises a stationary contactor for engaging a single turn of a resistance wire of a potentiometer card at a time, a support upon which a potentiometer card may be placed in a position in which one turn of a resistance wire thereof is engaged by the stationary contact and along which the potentiometer card may be slid for movement relative to the contactor, current-measuring means, means for electrically connecting the contactor to the current-measuring means, means for connecting a tapped turn of the resistance wire to the current-measuring means so that the current-measuring means indicates when the potentiometer card is in a position in which the contactor engages said tapped turn of the resistance wire, means for clamping the potentiometer card in the last-mentioned position, a movable contactor for engaging a single turn of the resistance wire at a time, means for sliding the movable contactor along the potentiometer card, means for electrically connecting the movable contactor to the current-measuring means, means for connecting another tapped turn of the resistance wire to the current-measuring means so that the current-measuring means indicates when the movable contactor contacts the second tapped turn of the resistance wire, and means for gaging the distance between the stationary contactor and the movable contactor.

3. A gage for determining the distance between two tapped turns of a resistance wire of a potentiometer card, which comprises a stationary contactor for engaging a single turn of a resistance wire of a potentiometer card at a time, a support upon which a potentiometer card may be placed in a position in which one turn of a resistance wire thereof is engaged by the stationary contact and along which the potentiometer card may be slid for movement relative to the contactor, means for electrically determining when the potentiometer card is in a position in which the contactor engages a tapped turn of the resistance wire, means for clamping the potentiometer card in the last-mentioned position, a movable contactor for engaging a single turn of the resistance wire at a time, means for sliding the movable contactor along the potentiometer card, means for electrically determining when the movable contactor engages a second tapped turn of the resistance wire, an electrical signal, and a switch for actuating the electrical signal and being operable when the movable contactor is moved too closely toward or too far from the stationary contactor.

4. A gage for determining the distance between two turns of a resistance wire of a potentiometer card having leads extending from the turns, which comprises a slide along which a potentiometer card may be slid, a contactor mounted at a predetermined point along the slide in a position pointing transversely with respect to the slide, means urging the contactor transversely of the slide into engagement with a turn of a resistance wire of such a potentiometer card positioned on the slide, a guideway offset from the slide and extending parallel thereto, a second contactor, a carriage mounted slidably in the guideway carrying the second-mentioned contactor in a position pointing transversely with respect to the slide, means selectively operable for adjusting the carriage toward and away from the first-mentioned contactor, means urging the second-mentioned contactor transversely toward the slide to force it into engagement with another turn of the resistance wire, a connector for contacting electrically one at a time a lead connected to a turn of the resistance wire near the first-mentioned contactor and a second lead of the resistance wire connected to a turn of the resistance wire near the second-mentioned contactor, means for impressing a potential difference across the connector and the contactors one at a time, means for measuring the resistance between the connector and the first-mentioned contactor so that the tapped turn of the wire may be located in contact with the first-mentioned contactor when the card is moved along the slide, means for clamping the card to the slide in a position in which the last-mentioned tapped turn is in contact with the first-mentioned contactor, means for measuring the resistance between the connector and the second-mentioned contactor so that the second-mentioned contactor may be located in contact with the second-mentioned tapped turn, and means operable by the slide for indicating when the distance between the first-mentioned contactor and the second-mentioned contactor is within a predetermined range.

5. A gage for determining the distance between two tapped turns of a resistance wire of a potentiometer card having lead wires extending therefrom, which comprises a stationary contactor mounted in a predetermined position pointing in a predetermined direction for engaging the turns of a resistance wire of such a potentiometer one at a time, a second contactor for engaging the turns of the resistance wire one at a time, means mounting the second contactor at a position spaced from the first-mentioned contactor and pointing in the same direction as the first-mentioned contactor, means selectively operable for moving the second-mentioned contactor toward and away from the first-mentioned contactor to adjust the spacing therebetween, means operable by the contactor-moving means for indicating the spacing between the two contactors, a slide extending between the contactors for supporting slidably the potentiometer card in a position extending between the contactors and in which turns of the resistance wire of the potentiometer card are engaged by the contactors, a connector for contacting one at a time the lead wires, means for impressing a potential difference across the connector and the contactors, means for measuring the resistance between the connector and the first-mentioned contactor so that the potentiometer card may be moved relative to that contactor until that contactor engages the turn to which the lead wire is electrically connected, means for clamping the potentiometer card against movement after the first-mentioned contactor engages the tapped turn of the resistance wire, said connector, said measuring means, said second-mentioned contactor serving to indicate when the second-mentioned contactor contacts a second tapped turn of a potentiometer card, and means including a limit switch operable by the second-mentioned contactor for indicating when the second-mentioned contactor is moved beyond a predetermined range.

6. A gage for determining the distance between two tapped turns of a resistance wire of a potentiometer card having lead wires extending therefrom, which comprises a stationary contactor mounted in a predetermined position pointing in a predetermined direction for engaging the turns of a resistance wire of such a potentiometer one at a time, a second contactor for engaging the turns of the resistance wire one at a time, means mounting the second contactor at a position spaced from the first-mentioned contactor and pointing in the same direction as the first-mentioned contactor, means selectively operable for moving the second-mentioned contactor toward and away from the first-mentioned contactor to adjust the spacing therebetween, means operable by the contactor-moving means for indicating the spacing between the two contactors, a slide extending between the contactors for supporting slidably the potentiometer card in a position extending between the contactors and in which turns of the resistance wire of the potentiometer card are engaged by the contactors, a connector for contacting one at a time the lead wires, means for impressing a potential difference across the connector and the contactors, means for measuring the resistance between the connector and the first-mentioned contactor so that the potentiometer card may be moved relative to that contactor until that contactor engages the turn to which the lead wire is electrically connected, and means for clamping the potentiometer card against movement after the first-mentioned contactor engages the tapped turn of the resistance wire, said connector, said measuring means, said second-mentioned contactor serving to indicate when the second-mentioned contactor contacts a second tapped turn of a potentiometer card.

RAYMOND W. MUELLER.
RICHARD STECH.

REFERENCES CITED

The following references are of record in the file of this patent:

UNITED STATES PATENTS

| Number | Name | Date |
|---|---|---|
| 329,181 | Marsh | Oct. 27, 1885 |
| 914,855 | Mastrangel | Mar. 9, 1909 |
| 1,407,693 | Heany | Feb. 28, 1922 |
| 1,579,291 | Emery | Apr. 6, 1926 |
| 1,643,949 | Kyle | Oct. 4, 1927 |
| 1,789,358 | Franks | Jan. 20, 1931 |
| 1,870,462 | McWeeny | Aug. 9, 1932 |
| 1,975,997 | Whitesell, Jr. | Oct. 9, 1934 |
| 2,166,692 | Ray | July 18, 1939 |
| 2,212,884 | Polasik | Aug. 27, 1940 |
| 2,350,862 | Ayers | June 6, 1944 |
| 2,367,513 | Malhiot | Jan. 16, 1945 |
| 2,415,105 | Longworth | Feb. 4, 1947 |
| 2,419,952 | Konicek et al. | May 6, 1947 |

FOREIGN PATENTS

| Number | Country | Date |
|---|---|---|
| 425,029 | Germany | Feb. 12, 1926 |
| 523,795 | Great Britain | July 23, 1940 |